United States Patent
Diamond et al.

(10) Patent No.: US 11,628,831 B2
(45) Date of Patent: Apr. 18, 2023

(54) SYSTEM AND METHOD FOR AUTONOMOUSLY NAVIGATING A VEHICLE IN A MANUFACTURING ENVIRONMENT

(71) Applicant: Ford Global Technologies, LLC, Dearborn, MI (US)

(72) Inventors: Brendan Diamond, Grosse Pointe, MI (US); Kevin James Rhodes, Dearborn, MI (US); Seth Loveall, Dearborn, MI (US); Jonathan Hair, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 175 days.

(21) Appl. No.: 17/021,282

(22) Filed: Sep. 15, 2020

(65) Prior Publication Data
US 2022/0080955 A1    Mar. 17, 2022

(51) Int. Cl.
*B60W 30/06*    (2006.01)
*H04W 4/44*    (2018.01)
*G05D 1/02*    (2020.01)

(52) U.S. Cl.
CPC .......... *B60W 30/06* (2013.01); *G05D 1/0212* (2013.01); *G05D 1/0248* (2013.01); *G05D 1/0278* (2013.01); *G05D 1/0297* (2013.01); *H04W 4/44* (2018.02)

(58) Field of Classification Search
CPC ...... B60W 30/06; H04W 4/44; G05D 1/0212; G05D 1/0248; G05D 1/0278; G05D 1/0297
See application file for complete search history.

(56) References Cited

U.S. PATENT DOCUMENTS

| | | | |
|---|---|---|---|
| 6,404,506 B1 * | 6/2002 | Cheng | G01B 11/04 356/615 |
| 10,336,384 B2 | 7/2019 | Nordbruch | |
| 2020/0130676 A1 * | 4/2020 | Smid | G05D 1/0231 |
| 2021/0286356 A1 * | 9/2021 | Yang | H04W 4/40 |
| 2022/0073108 A1 * | 3/2022 | Park | B60W 10/20 |

FOREIGN PATENT DOCUMENTS

| | | |
|---|---|---|
| DE | 102016004204 | 10/2017 |
| WO | 2017140423 | 8/2017 |
| WO | 2018145951 | 8/2018 |

* cited by examiner

*Primary Examiner* — Anne Marie Antonucci
*Assistant Examiner* — Jared C Bean
(74) *Attorney, Agent, or Firm* — Burris Law, PLLC (57) ABSTRACT

A method for autonomously navigating a subject vehicle from among a plurality of vehicles in an environment includes determining whether the subject vehicle is to be moved from a first post-production location to a second post-production location within the environment based on transportation scheduling data associated with the subject vehicle. The method includes executing a navigation routine in response to the transportation scheduling data indicating the subject vehicle is to be moved. The navigation routine includes obtaining location data associated with the plurality of vehicles, identifying a vehicle path for the subject vehicle based on the location data of the plurality of vehicles, the first post-production location, the second post-production location, or a combination thereof, and instructing the subject vehicle to autonomously travel along the vehicle path to the second post-production location.

14 Claims, 4 Drawing Sheets

SYSTEM AND METHOD FOR AUTONOMOUSLY NAVIGATING A VEHICLE IN A MANUFACTURING ENVIRONMENT

FIELD

The present disclosure relates to systems and methods for autonomously navigating a vehicle in a manufacturing environment.

BACKGROUND

The statements in this section merely provide background information related to the present disclosure and may not constitute prior art.

Upon completion of a manufacturing process for a vehicle, the vehicle can be temporarily positioned at various post-production locations in a manufacturing environment, such as a parking lot, prior to deployment to a final destination, such as a dealership. However, significant amounts of labor and infrastructure are needed to efficiently move the vehicles to and from various post-production locations. These and other issues related to moving the vehicles to and from various post-production locations are addressed by the present disclosure.

SUMMARY

This section provides a general summary of the disclosure and is not a comprehensive disclosure of its full scope or all of its features.

The present disclosure provides a method for autonomously navigating a subject vehicle from among a plurality of vehicles in an environment. The method includes determining whether the subject vehicle is to be moved from a first post-production location to a second post-production location within the environment based on transportation scheduling data associated with the subject vehicle. The method includes executing a navigation routine in response to the transportation scheduling data indicating the subject vehicle is to be moved. The navigation routine includes obtaining location data associated with the plurality of vehicles, identifying a vehicle path for the subject vehicle based on the location data of the plurality of vehicles, the first post-production location, the second post-production location, or a combination thereof, and instructing the subject vehicle to autonomously travel along the vehicle path to the second post-production location.

In some forms, the location data associated with the plurality of vehicles is obtained from a global navigation satellite system (GNSS) sensor of the plurality of vehicles, a vehicle-to-everything (V2X) communication system of the plurality of vehicles, or a combination thereof.

In some forms, the location data associated with the plurality of vehicles is obtained from an indoor positioning system within the environment.

In some forms, the location data associated with the plurality of vehicles is obtained from a laser position system within the environment.

In some forms, the method further includes capturing image data of the environment from one or more imaging sensors disposed within the environment and determining whether an object is present between the first post-production location and the second post-production location based on the image data. Identifying the vehicle path for the subject vehicle is further based on a location of the object in response to the object being present between the first post-production location and the second post-production location.

In some forms, the one or more imaging sensors are disposed on at least one of the plurality of vehicles.

In some forms, instructing the subject vehicle to autonomously travel along the vehicle path to the second post-production location further includes transmitting the vehicle path to the subject vehicle to have the subject vehicle autonomously travel to the second post-production location.

In some forms, instructing the subject vehicle to autonomously travel along the vehicle path to the second post-production location further includes remotely controlling an operation of the subject vehicle.

In some forms, identifying the vehicle path based on the second post-production location further includes a parking space from a plurality of parking spaces at the second post-production location based on an availability of the plurality of parking spaces and a departure time associated with the subject vehicle and defining the vehicle path from the first post-production location to the selected parking space.

The present disclosure also provides a method for autonomously navigating a subject vehicle from among a plurality of vehicles in an environment. The method includes determining whether the subject vehicle is to be moved from a first post-production location to a second post-production location within the environment at a departure time based on transportation scheduling data associated with the subject vehicle. The method includes obtaining image data from one or more imaging sensors disposed within the environment and location data associated with the plurality of vehicles, identifying a vehicle path based on the image data, the location data, the second post-production location, or a combination thereof, and at the departure time for the subject vehicle, instructing the subject vehicle to autonomously travel along the vehicle path.

In some forms, the location data associated with the plurality of vehicles is obtained from a global navigation satellite system (GNSS) sensor of the plurality of vehicles, a vehicle-to-everything (V2X) communication system of the plurality of vehicles, or a combination thereof.

In some forms, the location data associated with the plurality of vehicles is obtained from an indoor positioning system within the environment.

In some forms, the location data associated with the plurality of vehicles is obtained from a laser position system within the environment.

In some forms, the method further includes determining whether an object is present between the first post-production location and the second post-production location based on the image data. In some forms, identifying the vehicle path for the subject vehicle is further based on a location of the object in response to the object being present between the first post-production location and the second post-production location.

In some forms, the one or more imaging sensors are disposed on infrastructure elements within the environment.

In some forms, instructing the subject vehicle to autonomously travel along the vehicle path to the second post-production location further includes transmitting the vehicle path to the subject vehicle to have the subject vehicle autonomously travel to the second post-production location.

In some forms, instructing the subject vehicle to autonomously travel along the vehicle path to the second post-production location further includes remotely controlling an operation of the subject vehicle.

In some forms, identifying the vehicle path based on the second post-production location further includes selecting a parking space from a plurality of parking spaces at the second post-production location based on an availability of the plurality of parking spaces and the departure time and defining the vehicle path from the first post-production location to the selected parking space.

The present disclosure provides a system for autonomously navigating a subject vehicle from among a plurality of vehicles in an environment. The system includes one or more image sensors disposed within the environment, a controller communicably coupled to the one or more infrastructure sensors and the plurality of vehicles, where the controller is configured to execute a navigation routine at a departure time. During the navigation routine, the controller is configured to obtain image data from the one or more imaging sensors, obtain location data associated with the plurality of vehicles, identify a vehicle path based on the image data, the location data, and a post-production location, and instruct the subject vehicle to autonomously travel along the vehicle path to the post-production location.

In some forms, the controller is configured to select a parking space from a plurality of parking spaces at the post-production location based on an availability of the plurality of parking spaces and the departure time and define the vehicle path to the selected parking space.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure relates to systems and methods for autonomously navigating a vehicle in a manufacturing environment. More particularly, based on transportation scheduling data associated with vehicles manufactured in the manufacturing environment (i.e., a completed vehicle), a central control system is configured to determine whether a completed vehicle is to be moved from a first post-production location to a second post-production location. To move the completed vehicle, the central control system is configured to identify a vehicle path for the completed vehicle based on, for example, location data of the completed vehicles, and the central control system instructs the vehicle to autonomously travel along the vehicle path to the second post-production location. As such, the central control system is configured to improve the efficiency in which vehicles move to and from various post-production locations in the manufacturing environment.

Figure 1:
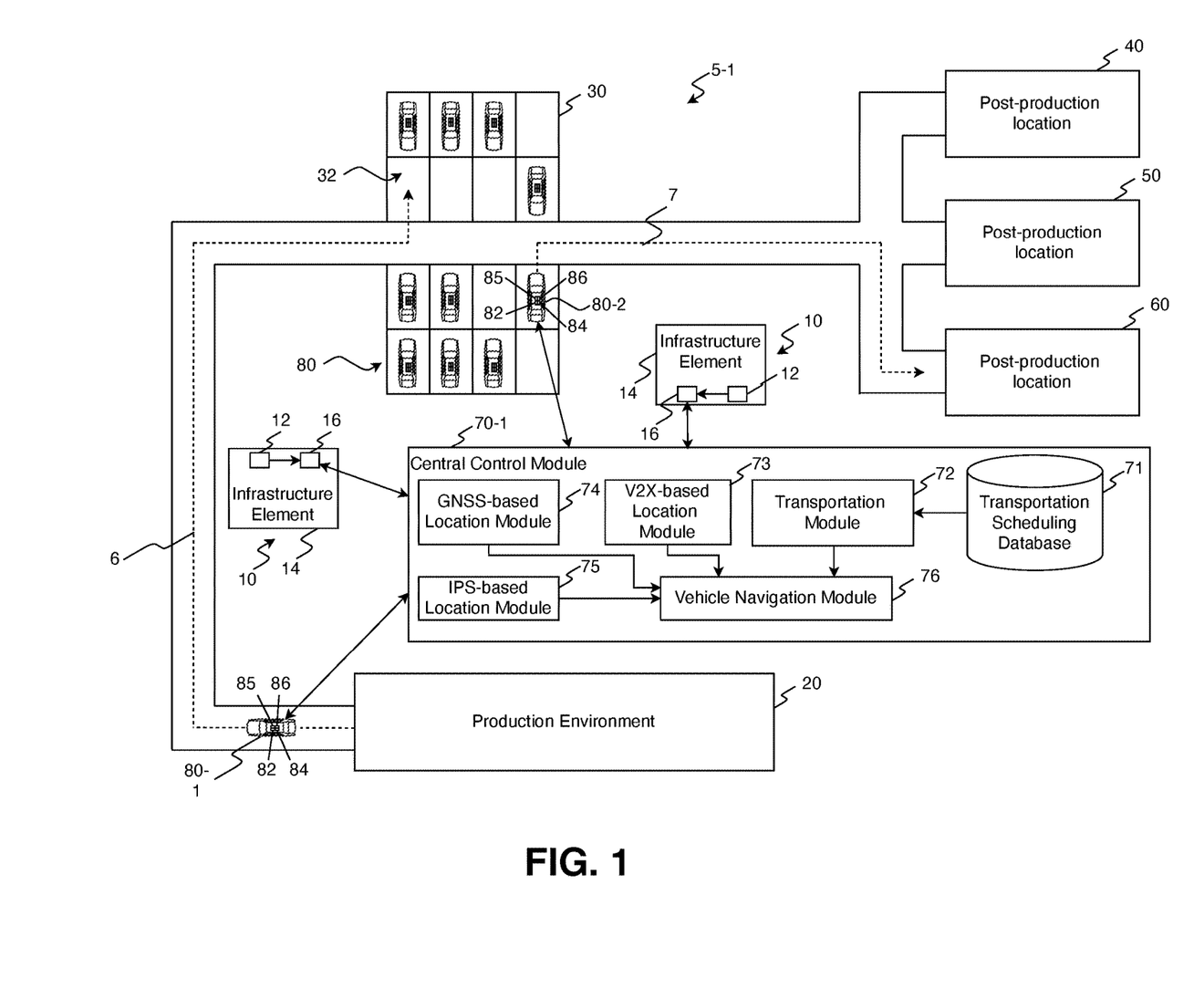
FIG. 1 illustrates a manufacturing environment according to the present disclosure.

Referring to FIG. 1, a manufacturing environment 5-1 for manufacturing a vehicle is provided. The manufacturing environment 5-1 generally includes one or more infrastructure sensor systems 10 ("infrastructure sensor system 10" hereinafter), a production environment 20, post-production locations 30, 40, 50, 60, a central control system 70-1, and a plurality of vehicles 80-1, 80-2 (collectively referred to as vehicles 80). While the central control system 70-1 is illustrated as part of the manufacturing environment 5-1, it should be understood that the central control system 70-1 may be positioned remotely from the manufacturing environment 5-1 in other forms.

In one form, the vehicles 80 are partially or fully-autonomous vehicles 80, and thus, can be autonomously moved to various locations of the environment 5-1, as instructed by the central control system 70-1. To autonomously drive itself, the vehicles 80 include one or more control modules to control various sub-systems within the vehicle (e.g., powertrain, steering, and/or brakes). These modules are broadly represented as an autonomous control module 86.

As described herein, the central control system 70-1 is configured to monitor the location of the vehicle 80 and communicate with the vehicles 80. To support these features, in one form, the vehicles 80 are equipped with a V2X module 84 for establishing a communication link with the central control system 70-1 and/or a location sensor (e.g., a global navigation satellite system (GNSS) sensor 82 and/or or the IPS sensor 85) for providing location data of the vehicle 80. The V2X module 84 provides a dedicated short-range communication (DSRC) system and/or a cellular system that communicates with the central control system 70-1 using a 75 megahertz (MHz) band around a 5.9 gigahertz (GHz) signal. In another form, an external device (e.g., a dongle) may be attached to the vehicles 80 to communicably couple the vehicle 80 to the central control system 70-1 and provide location data of the vehicle 80. Accordingly, the external device may include various electronic components and/or interfaces, such as a location sensor (e.g., GNSS or IPS sensor) for providing the location data, a communication transceiver for establishing a communication link with the central control system 70-1, an input/output interface to communicate with the control modules of the vehicle, and/or a fastening mechanism to attach to/detach from the vehicle. It should be readily understood, that the vehicles 80 may be different from one another (e.g., different make/model, different level of automation, some vehicles 80 employ V2X while others may not, among other variations).

In the exemplary application provided by the manufacturing environment 5-1, the vehicle 80-1 arrives from an assembly line within the production environment 20 and proceeds to the post-production location 30, as indicated by dashed arrow 6. As an example, the post-production location 30 is a parking lot that includes a plurality of parking spaces in which the vehicles 80 are temporarily stored prior to being moved to one of the post-production locations 40, 50, 60. Furthermore, the post-production locations 40, 50, 60 may be one of a vehicle repair station, a shipping station in which the vehicles 80 are loaded onto a transportation medium (e.g., a car carrier trailer, a truck, a train, a boat, etc.). While various examples of the post-production locations 30, 40, 50, 60 are provided, it should be understood that the post-production locations 30, 40, 50, 60 are merely examples and can be any post-production location within the manufacturing environment 5-1. As used herein, the "post-production location" refers to any location within a manufacturing environment 5-1 in which the vehicles 80 can be positioned when the vehicles 80 exit the production environment 20 (i.e., once the vehicle 80 manufacturing process is completed) and prior to being transported externally from the manufacturing environment 5-1 (e.g., prior to being transported to a dealership).

In one form, the infrastructure sensor system 10 include imaging sensors 12 for obtaining imaging data of the manufacturing environment 5-1 (e.g., the post-production location 30) and detecting objects within the manufacturing environment 5-1. The imaging sensors 12 may include a two-dimensional camera, a three-dimensional camera, an infrared sensor, a radar scanner, a laser scanner, a light detection and ranging (LIDAR) sensor, an ultrasonic sensor, and/or among others. In one form, the imaging sensors 12 are disposed on an infrastructure element 14 within the manufacturing environment 5-1, such as, but not limited to, a tower, a light pole, a building, a sign, drones, robots, automated guided vehicles, and/or among others fixed and/or moveable elements.

The infrastructure sensor system 10 also includes one or more controllers 16 ("controller 16" hereinafter) configured to detect the presence of objects within the manufacturing environment 5-1. Specifically, the controller 16 employs known digital image recognition techniques to process the image data and identify the objects captured by the imaging sensors 12. The controller 16 may also provide characteristics of the object, such as a location of the object based on a digital map representing the manufacturing environment 5-1, object type, travel direction/speed if the object is moving, among others. The controller 16 communicates said detection of objects and requisite characteristics as object data to the central control system 70-1. In one form, to perform the functionality of described herein, the controller 16 includes one or more processor circuits that are configured to execute machine-readable instructions stored in one or more nontransitory computer-readable mediums, such as a random-access memory (RAM) circuit and/or read-only memory (ROM) circuit. The controller 16 may include other components for performing the operations described herein such as, but not limited to, transceivers, router, and/or input/output interface hardware.

As provided above, the central control system 70-1 is configured to determine whether one of the vehicles 80 within the manufacturing environment 5-1 is to be moved and then instruct the vehicle 80 to autonomously travel to the post-production location based on a defined vehicle path. In one form, the central control system 70-1 includes a transportation scheduling database 71, a transportation module 72, a vehicle-to-everything-based (V2X-based) location module 73, a global navigation satellite system-based (GNSS-based) location module 74, an indoor positioning system-based (IPS-based) location module 75, and a vehicle navigation module 76. It should be readily understood that any one of the modules of the central control system 70-1 can be provided at the same location or distributed at different locations and communicably coupled accordingly. To perform the functionality as described herein, the central control system 70-1 includes one or more processor circuits that are configured to execute machine-readable instructions stored in one or more nontransitory computer-readable mediums, such as a RAM circuit and/or ROM circuit. It should be readily understood that the central control system 70-1 may include other components for performing the operations described herein such as, but not limited to, communication transceivers, routers, input/output communication interfaces, databases, among others.

The transportation module 72 is configured to determine whether one of the vehicles 80 is to be moved to and/or from one of the post-production locations 30, 40, 50, 60 based on transportation scheduling data from the transportation scheduling database 71. In one form, the transportation scheduling data is provided in the transportation scheduling database 71 and is configured as a lookup table that associates each of the vehicles 80 with a departure time from the manufacturing environment 5-1, a departure location from the manufacturing environment 5-1, and a default vehicle path to the departure location. As an example, the transportation scheduling data may indicate that vehicle 80-2 (i.e., a subject vehicle) is scheduled to depart from post-production location 30 at a given time and is to autonomously travel to the post-production location 60 by way of a default (i.e., an initial) vehicle path, indicated by dashed arrow 7.

Furthermore, the transportation scheduling data associates each of the vehicles 80 with at least one of the post-production locations 30, 40, 50, 60 assigned to the respective vehicle 80 based on the vehicle type and vehicle data (e.g., a number of cold starts associated with the vehicle 80, a fuel level of the vehicle 80, a number of instances in which the vehicle 80 has been moved, among others). As an example, the transportation scheduling data may indicate that when vehicle 80-1 departs the production environment 20, vehicle 80-1 will autonomously travel to the post-production 30 and park in parking space 32 provided that parking space 32 is available, as described below in further detail. As another example, the transportation scheduling data may indicate that when vehicle 80-2 departs the post-production location 30, vehicle 80-2 will autonomously travel to post-production location 60 as a result of the post-production location 60 being associated with the same vehicle type as vehicle 80-2.

In one form, the transportation module 72 may obtain the departure time and departure location for the vehicle 80 from a remote computing device provided within the production environment 20 and communicably coupled to the central control system 70-1 and/or a control module of the vehicle 80. In another form, the transportation scheduling data is prestored in the transportation scheduling database 71. For example, the transportation scheduling data for a given time period (e.g., week, day, etc.,) can be updated and stored in the transportation scheduling database 71.

With the subject vehicle 80 to be moved identified, the vehicle navigation module 76 is configured to perform a navigation routine to move the subject vehicle 80 to and/or from the post-production locations 30, 40, 50, 60 based on a defined vehicle path. As an example, the vehicle navigation module 76 obtains the location of the subject vehicle 80 and, in some forms, the other vehicles 80 from the V2X-based location module 73, the GNSS-based location module 74, and/or the IPS-based location module 75.

More particularly, in one form, the V2X-based location module 73 of the central control system 70-1 receives location data in the form of a basic safety message (BSM) from the V2X module 84 of the vehicle 80. As another example; the GNSS-based location module 74 obtains the location data from the GNSS sensor 82 of the vehicles 80 using a wireless communication protocol (e.g., a Bluetooth® protocol, a cellular protocol, a wireless fidelity (Wi-Fi) protocol, a near-field communication (NFC) protocol, an ultra-wideband (UWB) protocol, and the like). In yet another example, the IPS-based location module 75 obtains the location data from the IPS sensor 85 (e.g., an ultra-wideband (UWB) sensor) of the vehicles 80 using a wireless communication protocol (e.g., the UWB protocol). It should be readily understood that the GNSS-based location module 74 and/or IPS-based location module 75 may receive location data of the vehicles from a GNSS sensor and/or an IPS sensor provided with the external device attached to the vehicle 80. Furthermore, the central control system 70-1 may include the V2X-based location module 73, the GNSS-based location module 74, the IPS-based location module 75, or a combination thereof, and is not required to have each of the modules 73, 74, and 75.

The vehicle navigation module 76 is configured to identify a vehicle path for the corresponding vehicle 80 based on the location data, the transportation scheduling data, the object data, and/or one or more of the post-production locations 30, 40, 50, 60. As an example, the vehicle navigation module 76 may determine that vehicle 80-2 is to be moved along a default vehicle path as indicated by dashed arrow 7 from post-production location 30 to post-production location 60 at a given time in accordance with the transportation scheduling data. Furthermore, the vehicle navigation module 76 may determine whether an object is present along the default vehicle path between post-production location 30 and post-production location 60 based on a comparison of the default path to the location of the object as determined by the infrastructure sensor system 10. To define the default vehicle path and/or adjust vehicle path, the navigation module 76 may perform known vehicle navigation routines, such as a path planning routine, a maneuver planning routine, and/or a trajectory planning routine.

In one form, the vehicle navigation module 76 is configured to adjust the default vehicle path if the controller 16 determines that an object is located along the default vehicle path between post-production location 30 and post-production location 60. As an example and as shown in FIG. 1, with no object being present along the default vehicle path between post-production location 30 and post-production location 60, the vehicle navigation module 76 does not adjust the default vehicle path to the post-production location 60.

As another example, the transportation module 72 determines that vehicle 80-1 is to be moved from the production environment 20 to parking space 32 of the post-production location 30 along a default vehicle path indicated by dashed arrow 6 at a given time based on the transportation scheduling data. Furthermore, the vehicle navigation module 76 may obtain a determination from the infrastructure sensor system 10 indicating an availability of parking spaces at post-production location 30 based on the corresponding image data. Accordingly, the vehicle navigation module 76 may adjust the default vehicle path if the controller 16 determines that parking space 32 is unavailable. For example and as shown in FIG. 1, with parking space 32 being available, the vehicle navigation module 76 proceeds to navigate the vehicle based on the default vehicle path 5 to parking space 32. Alternatively, if parking space 32 is unavailable, the vehicle navigation module 76 may adjust the vehicle path so that the vehicle 80 moves to an available space.

In another example, the transportation module 72 may determine that vehicle 80-1 is to be moved from the production environment 20 to parking space 32 of the post-production location 30 along a default vehicle path indicated by dashed arrow 6 at a given time based on the transportation scheduling data. Furthermore, the vehicle navigation module 76 may obtain a determination from the GNSS-based location module 74 and/or the V2X-based location module 73 indicating whether another vehicle 80 is impeding vehicle 80-1 along the default vehicle path. Accordingly, the vehicle navigation module 76 may adjust the default vehicle path if at least one of the GNSS-based location module 74 and the V2X-based location module 73 determine that another vehicle 80 is impeding vehicle 80-1.

In one form, the navigation routine also includes instructing the vehicles 80 to autonomously travel along various vehicle paths to and/or from the post-production locations 30, 40, 50, 60. As shown in FIG. 1, the vehicle navigation module 76 is configured to instruct vehicle 80-1 to travel along the default vehicle path indicated by dashed arrow 6 to post-production location 30, and the vehicle navigation module 76 is configured to instruct vehicle 80-2 to travel along the default vehicle path indicated by dashed arrow 7 from post-production location 30 to post-production location 60. As an example, the vehicle navigation module 76 instructs the vehicle 80-1 by transmitting the vehicle path to the autonomous control module 86 of the vehicle 80-1, which utilizes the vehicle path to autonomously travel to post-production location 30. As another example, the vehicle navigation module 76 instructs vehicle 80-2 to by remotely and autonomously controlling the vehicle 80 as it travels from post-production location 30 to post-production location 60.

Figure 2:
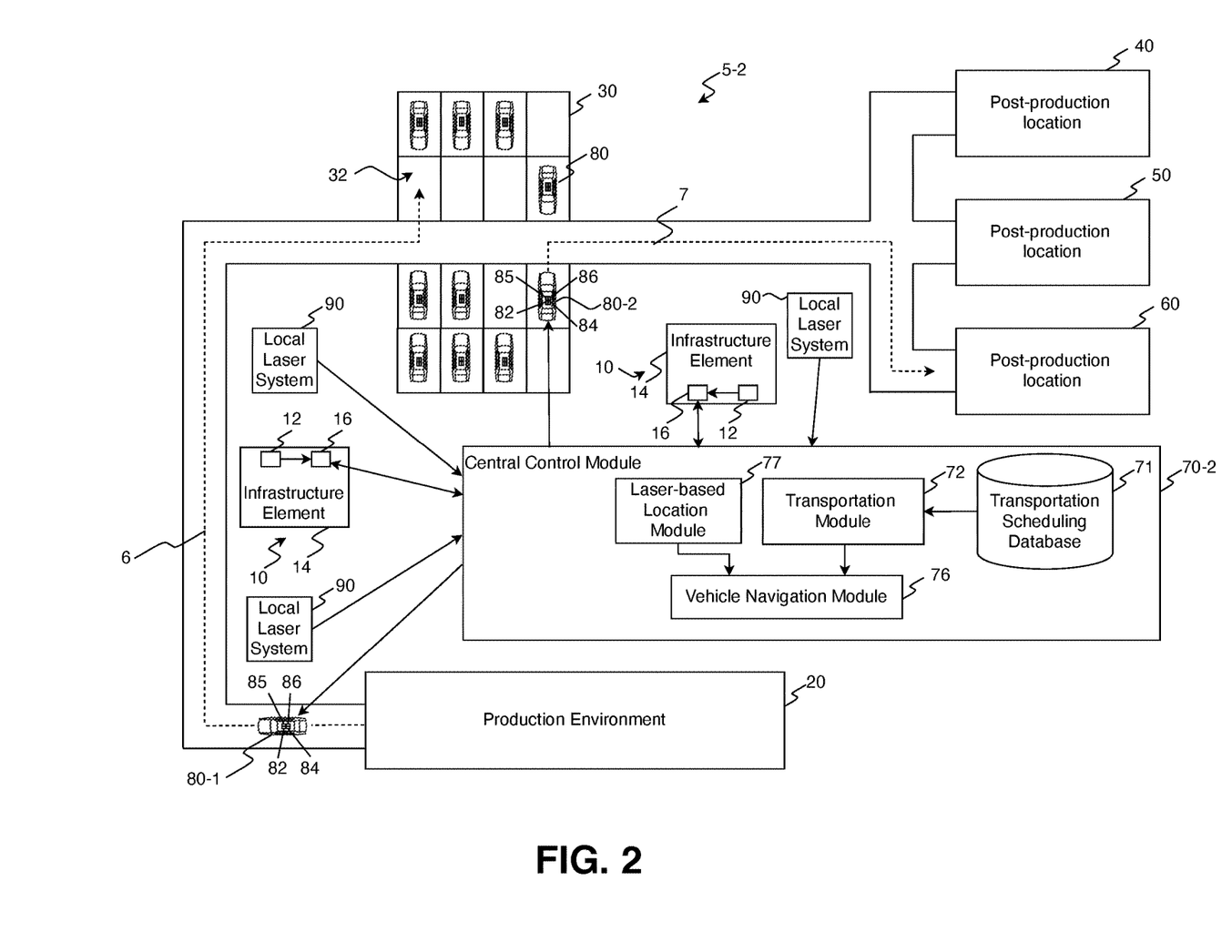
FIG. 2 illustrates another manufacturing environment according to the present disclosure.

Referring to FIG. 2, a manufacturing environment 5-2 for manufacturing a vehicle is provided and includes a central control system 70-2. The manufacturing environment 5-2 is similar to manufacturing environment 5-1 described above with reference to FIG. 1, but in this form, the GNSS-based location module 74 and the V2X-based location module 73 of the central control system 70-1 are replaced with a laser-based location module 77 in the central control system 70-2. Additionally, the manufacturing environment 5-2 includes a plurality of local laser systems 90 for obtaining the location data of the vehicles 80.

More particularly, each of the local laser systems 90 includes a laser that is projected to one or more locations in the manufacturing environment 5-2 and a laser interrupt detection hardware that is configured to broadcast an output to the central control system 70-1 indicating whether the vehicles 80 interrupt a beam projected by the corresponding laser. Based on the outputs of each of the local laser systems 90, the laser-based location module 77 is configured to determine the location of the vehicles 80. In one form, the local laser systems 90 may scan identifying features of the vehicles 80 (e.g., a vehicle identification number (VIN) or radio-frequency identification (RFID) tag that uniquely identifies each of the vehicles 80) to identify the respective vehicle 80 within the manufacturing environment 5-2. The local laser systems 90 may scan the identifying features using the same laser that is projected to the one or more locations in the manufacturing environment as described above or using a separate laser of the local laser system 90. As such, the local laser systems 90 may broadcast an output to the central control system 70-2 identifying the vehicle 80 in addition to broadcasting an output indicating whether the vehicles 80 interrupt the beam projected by the corresponding laser. While three local laser systems 90 are shown in FIG. 2, it should be understood that any number of local laser systems 90 may be included within the manufacturing environment 5-2.

Figure 3:
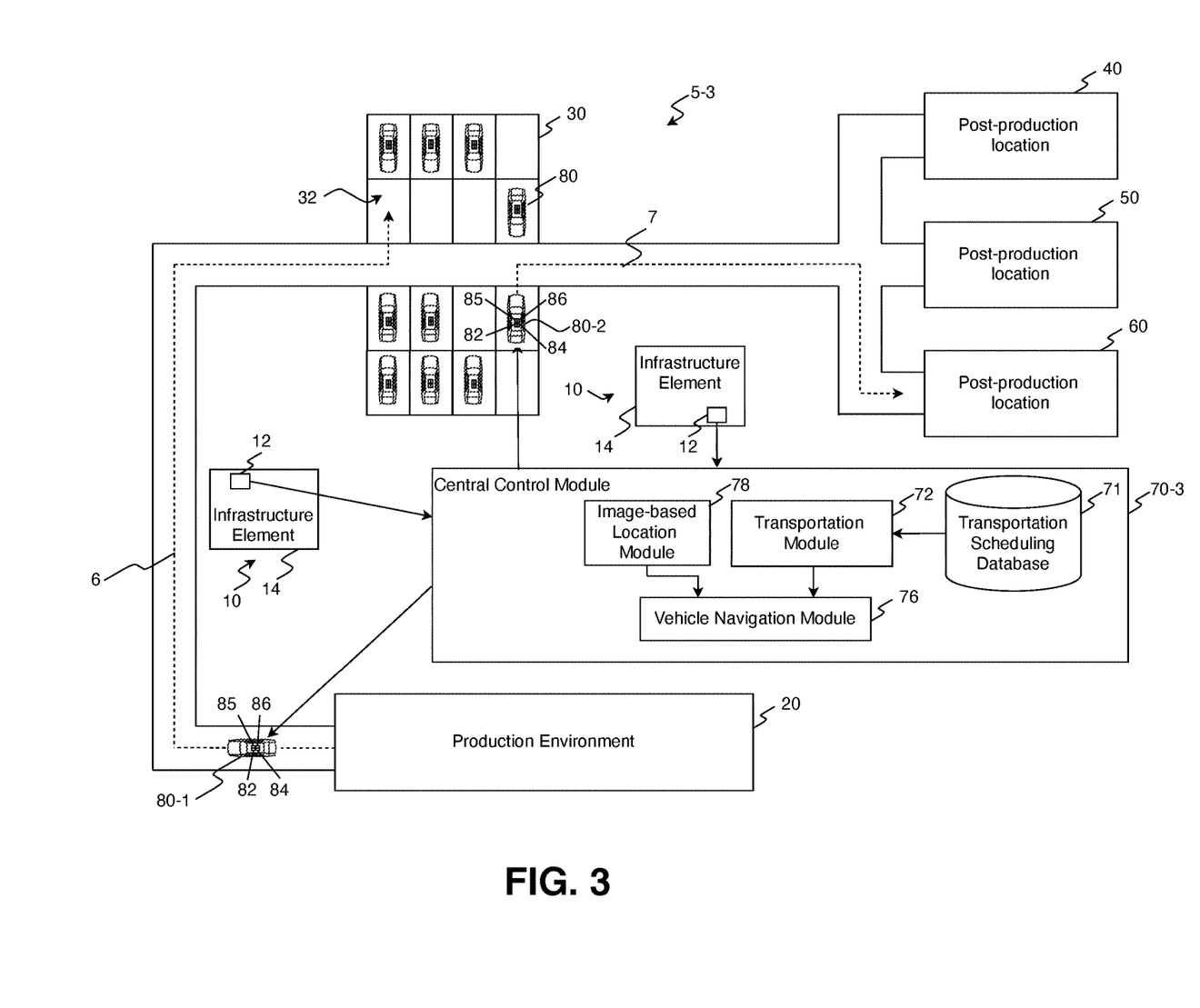
FIG. 3 illustrates yet another manufacturing environment according to the present disclosure.

Referring to FIG. 3, a manufacturing environment 5-3 for manufacturing a vehicle 80 is provided and includes a central control system 70-3. The manufacturing environment 5-3 is similar to manufacturing environment 5-1 described above with reference to FIG. 1, but in this form, the GNSS-based location module 74 and the V2X-based location module 73 of the central control system 70-1 are replaced with an image-based location module 78 in central control system 70-3, and the controller 16 is removed from the infrastructure elements 14. In one form, the image data obtained by the imaging sensors 12 is provided to the image-based location module 78, which in return determines the location of the vehicles 80. For example, the image-based location module 78 is configured to compare the image data to reference images of the manufacturing environment 5-3 that are tagged with predetermined location information. That is, using known image recognition techniques, the image-based location module 78 identifies and locates objects, such as the vehicles 80.

In one form, in addition to obtaining image data from the imaging sensors 12 disposed at the infrastructure element 14, the controller 16 or the image-based location module 78 may obtain image data from imaging sensors provided on the vehicles 80. More particularly, the vehicles 80 equipped with V2X communication, may establish communication links with the controller 16 to provide data, such as, but not limited to: image data from imaging sensors disposed about the vehicle 80 and/or object data indicative of objects detected by the vehicle 80 (e.g., object data may include object type, object position, travel direction/speed for a moving object, among other information).

While manufacturing environments 5-1, 5-2, 5-3 are shown as separate example manufacturing environments in FIGS. 1-3, respectively, it should be understood that the components of the manufacturing environments 5-1, 5-2, 5-3 can be selectively combined to autonomously navigate the vehicles 80 to various post-production locations 30, 40, 50, 60 within the respective manufacturing environment.

Figure 4:
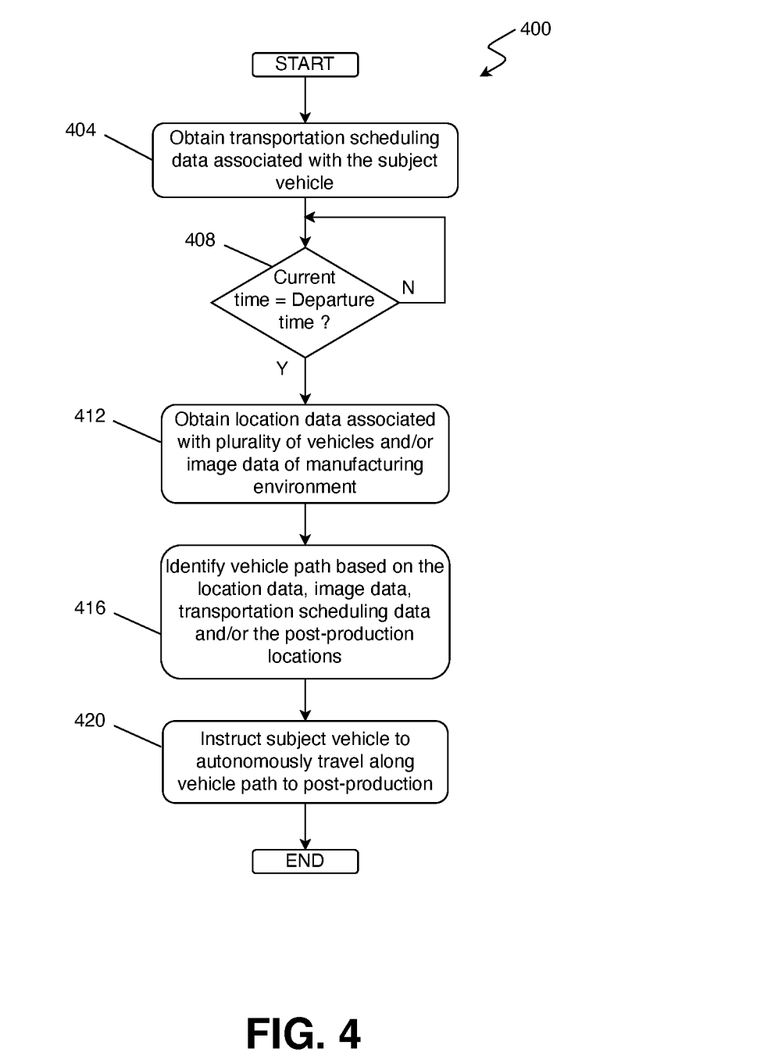
FIG. 4 is a flowchart of a routine for autonomously navigating a vehicle in a manufacturing environment according to the present disclosure.

Referring to FIG. 4, an example routine 400 for autonomously navigating the vehicle 80 is provided and may be executed by central control system 70 (i.e., one of the central control systems 70-1, 70-2, 70-3). At 404, the central control system 70 obtains the transportation scheduling data associated with a subject vehicle (e.g., vehicle 80-1). At 408, the central control system 70 determines whether the departure time associated with the subject vehicle indicates the subject vehicle is to be moved from one post-production location to another post-production location at the current time. If so, the central control system 70 proceeds to 412. If the departure time associated with the subject vehicle indicates the subject vehicle is not to be moved, the central control system 70-1 waits until such departure time. At 412, the central control system 70-1 obtains the location data associated with the vehicles 80 and/or image data associated with the manufacturing environment. At 416, the central control system 70-1 identifies the vehicle path based on the location data, the post-production locations, the image data, and/or the transportation scheduling data. At 420, the central control system 70-1 instructs the subject vehicle to autonomously travel along the vehicle path to the post-production location.

It should be understood that routine 400 is merely an example routine and other routines may be executed in other forms.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice; material, manufacturing, and assembly tolerances; and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure. Furthermore, various omissions, substitutions, combinations, and changes in the forms of the systems, apparatuses, and methods described herein may be made without departing from the spirit and scope of the disclosure even if said omissions, substitutions, combinations, and changes are not explicitly described or illustrated in the figures of the disclosure.

In the figures, the direction of an arrow, as indicated by the arrowhead, generally demonstrates the flow of information (such as data or instructions) that is of interest to the illustration. For example, when element A and element B exchange a variety of information, but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, the term "module" and/or "controller" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The module may include one or more interface circuits. In some examples the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

What is claimed is:

1. A method for autonomously navigating a subject vehicle from among a plurality of vehicles in an environment, the method comprising:
   determining whether the subject vehicle is to be moved from a first post-production location to a second post-production location within the environment based on transportation scheduling data associated with the subject vehicle, wherein the transportation scheduling data associates the subject vehicle with a departure time from the environment, a departure location from the environment, and a default vehicle path to the second post-production location; and
   executing a navigation routine in response to the transportation scheduling data indicating the subject vehicle is to be moved, wherein the navigation routine includes:
      obtaining image data associated with the plurality of vehicles;
      determining an image-based location of each of the plurality of vehicles based on a difference between the image data and one or more reference images that are tagged with predetermined location information;
      identifying a vehicle path for the subject vehicle based on the image-based location of the plurality of vehicles, the default vehicle path to the second post-production location, the first post-production location, and the second post-production location; and
      instructing the subject vehicle to autonomously travel along the vehicle path to the second post-production location.

2. The method of claim 1 further comprising:
   capturing image data of the environment from one or more imaging sensors disposed within the environment; and
   determining whether an object is present between the first post-production location and the second post-production location based on the image data,
   wherein identifying the vehicle path for the subject vehicle is further based on a location of the object in response to the object being present between the first post-production location and the second post-production location.

3. The method of claim 2, wherein the one or more imaging sensors are disposed on at least one of the plurality of vehicles.

4. The method of claim 1, wherein instructing the subject vehicle to autonomously travel along the vehicle path to the second post-production location further comprises transmitting the vehicle path to the subject vehicle to have the subject vehicle autonomously travel to the second post-production location.

5. The method of claim 1, wherein instructing the subject vehicle to autonomously travel along the vehicle path to the second post-production location further comprises remotely controlling an operation of the subject vehicle.

6. The method of claim 1, wherein identifying the vehicle path based on the second post-production location further comprises:
   selecting a parking space from a plurality of parking spaces at the second post-production location based on an availability of the plurality of parking spaces and the departure time associated with the subject vehicle; and
   defining the vehicle path from the first post-production location to the selected parking space.

7. A method for autonomously navigating a subject vehicle from among a plurality of vehicles in an environment, the method comprising:
   determining whether the subject vehicle is to be moved from a first post-production location to a second post-production location within the environment at a departure time from the environment based on transportation scheduling data associated with the subject vehicle, wherein the transportation scheduling data associates the subject vehicle with the departure time, a departure location from the environment, and a default vehicle path to the second post-production location, and wherein the second post-production location includes a plurality of parking spaces;
   obtaining image data from one or more imaging sensors disposed within the environment and location data associated with the plurality of vehicles;
   selecting a parking space from among the plurality of parking spaces based on the image data;
   determining an image-based location of each of the plurality of vehicles based on a difference between the image data and one or more reference images that are tagged with predetermined location information;
   defining a vehicle path based on the parking space, the image-based location, and the default vehicle path to the second post-production location; and
   at the departure time for the subject vehicle, instructing the subject vehicle to autonomously travel along the vehicle path.

8. The method of claim 7 further comprising determining whether an object is present between the first post-production location and the second post-production location based on the image data, wherein identifying the vehicle path for the subject vehicle is further based on a location of the object in response to the object being present between the first post-production location and the second post-production location.

9. The method of claim 7, wherein the one or more imaging sensors are disposed on infrastructure elements within the environment.

10. The method of claim 7, wherein instructing the subject vehicle to autonomously travel along the vehicle path to the second post-production location further comprises transmitting the vehicle path to the subject vehicle to have the subject vehicle autonomously travel to the second post-production location.

11. The method of claim 7, wherein instructing the subject vehicle to autonomously travel along the vehicle path to the second post-production location further comprises remotely controlling an operation of the subject vehicle.

12. The method of claim 7, wherein identifying the vehicle path based on the second post-production location further comprises:

selecting the parking space based on an availability of the plurality of parking spaces and the departure time.

13. A system for autonomously navigating a subject vehicle from among a plurality of vehicles in an environment, the system comprising:
one or more image sensors disposed within the environment;
a controller communicably coupled to the one or more image sensors and the plurality of vehicles, wherein the controller is configured to execute a navigation routine at a departure time, wherein during the navigation routine, the controller is configured to:
determine whether the subject vehicle is to be moved from a first post-production location to a second post-production location within the environment at the departure time from the environment based on transportation scheduling data associated with the subject vehicle, wherein the transportation scheduling data associates the subject vehicle with the departure time, a departure location from the environment, and a default vehicle path to the second post-production location, and wherein the second post-production location includes a plurality of parking spaces;
obtain image data from the one or more imaging sensors;
determine an image-based location of each of the plurality of vehicles based on a difference between the image data and one or more reference images that are tagged with predetermined location information;
select a parking space from among the plurality of parking spaces based on the image data;
define a vehicle path based on the parking space, the image-based location, and the default vehicle path to the second post-production location; and
instruct the subject vehicle to autonomously travel along the vehicle path to the post-production location at the departure time.

14. The system of claim 13, wherein the controller is configured to:
select the parking space based on an availability of the plurality of parking spaces and the departure time.

* * * * *